July 10, 1928.
N. M. SMALL
CHECK VALVE
Filed Sept. 6, 1927
1,677,056
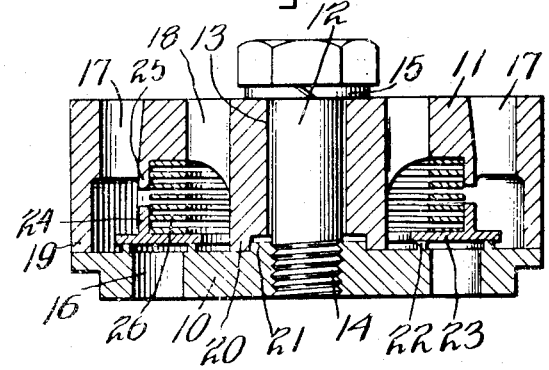
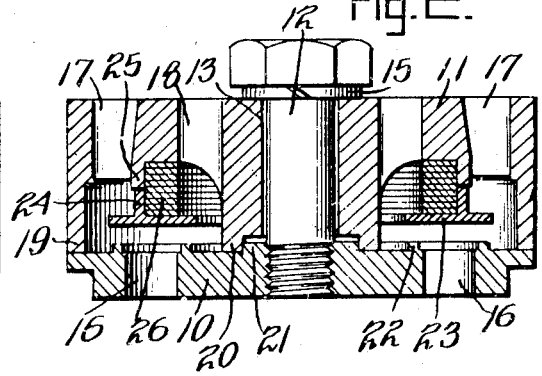
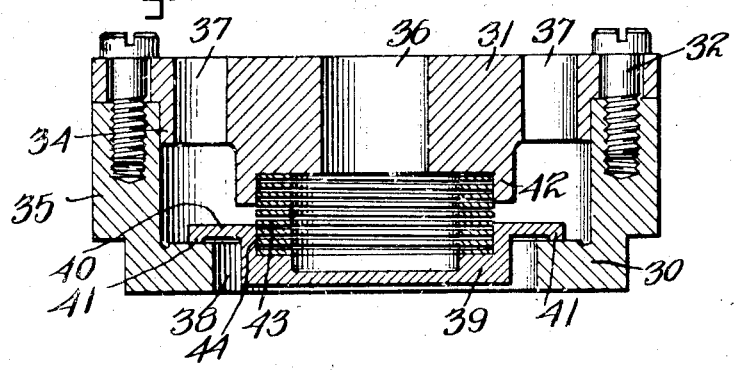
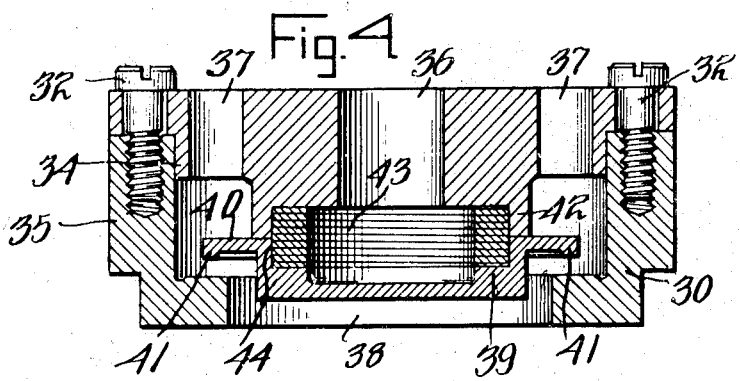
Inventor
Norman M. Small.
By
Attorney Patented July 10, 1928.

1,677,056

UNITED STATES PATENT OFFICE.

NORMAN M. SMALL, OF WAYNESBORO, PENNSYLVANIA, ASSIGNOR TO FRICK COMPANY, OF WAYNESBORO, PENNSYLVANIA, A CORPORATION.

CHECK VALVE.

Application filed September 6, 1927. Serial No. 217,748.

This invention relates to an improvement in check valves and it is an object of the invention to devise a ring plate valve in which the spring which seats the valve plate also guides the plate upon its seat. In known valves of this general character it has been found necessary to provide guides for the valve plate. These guides frequently became worn due to lack of lubrication and high temperatures to which they were subjected. It is an object of this invention to provide a valve in which the spring which seats the valve plate will also act as a guide for the plate and thus eliminate the guide with the consequent troubles caused by wear.

A further object is to provide a valve having few parts yet complete and efficient in operation.

Referring to the accompanying drawings which are made a part hereof and on which similar reference characters indicate similar parts, Figure 1 is a vertical sectional view showing the valve closed.

Figure 2 is a view similar to Figure 1 showing the valve in open position.

Figure 3 is a vertical section of a modified form of valve showing the valve in closed position, and Figure 4 is a view similar to Figure 3 showing the valve in open position.

In the drawings numerals 10 and 11 indicate what may be termed the lower and upper sections of a separable valve, which parts may be held together by a bolt or screw 12 which passes through a bore 13 somewhat larger than the bolt 12 and is screw-threaded into the member 10 at 14. If desired, a washer 15 may be provided between the head of the bolt and the member 11.

While the members 10 and 11 have been referred to as lower and upper members, it is of course understood that these terms are used merely for the purpose of description as the valve may be used in any position.

The lower member 10 is provided with bores 16 which provide inlet passages through the valve. The upper member 11 is provided with bores 17 and 18 which provide the outlet passages to the valve. The upper member 11 is also provided with an annular flange 19 which provides the outer wall of the valve. An inner annular flange 20 is adapted to rest around a shoulder 21 on the member 10. The flange 20 and the shoulder 21 secure the upper and lower parts of the valve against misalinement.

Surrounding the bores 16 upon the upper face of the member 10 are ridges or flanges 22 which provide seats for the valve or ring plate 23. This ring plate has integral therewith a ring or flange 24 which ring is adapted to abut against a depending ring or flange 25 within the member 11. A compression spring 26 is positioned between the ring plate 23 and the member 11. This spring is seated neatly within the flange 25 at one end and within the flange 24 at the other.

The operation of the valve should be apparent from the foregoing description. The ring plate 23 is normally seated to close the inlet passages 16 being held in a closed position by the spring 26. This valve is opened by a pressure fluid entering through 16 and permits the passage of fluid only in one direction. The rings 25 and 24 secure the compression spring 26 from getting out of position. As there is nothing within the valve upon which this spring may catch the probability of its getting out of position is remote. The valve, therefore, does not require the attention necessary in most check valves of this general type.

In the modified form shown in Figs. 3 and 4 a series of bolts 32 are used to secure the valve members 30 and 31 together. A depending flange 34 on the member 31 fits within an upstanding flange 35 on the member 30 and secures the members 30 and 31 against radial displacement. The member 31 is provided with bores 36 and 37 which provide outlets for the fluid passage through the valve. The lower member 30 of the valve has an inlet passage 38. The ring plate 39 has a flange 40 which has thereon a depending edge 41 which provides seating contact with the valve seat 30.

The member 31 has a depending flange 42 against which the ring plate 39 rests when the valve is in open position. A compression spring 43 is confined between the ring plate 39 and the member 31 and rests at one end neatly within the flange 42 and at the other end in the flange 44 on the ring plate 39.

In both the forms shown in Figs. 1 and 2 and that shown in Figs. 3 and 4 a special guide for the spring and the ring plate is dispensed with and the spring is held within the flanges. The valves likewise are very simple to take apart when this becomes necessary.

It will be obvious to those skilled in the art that various changes may be made in my device without departing from the spirit of the invention, and I, therefore, do not limit myself to what is shown by the drawings and described in the specification, but only as set forth in the appended claims.

Having thus fully described my said invention, what I claim as new and desire to secure by Letters Patent, is:

1. The combination of upper and lower detachable sections having fluid passages therethrough and forming a valve body, a seat in said valve body, a ring plate having a flat portion for cooperation with said seat for closing the passages through the valve, a spring for holding said ring plate upon the seat and having one end confined in a channel in one of the members of the valve body and having its other end disposed in a channel in the ring plate whereby its motion will be guided and held against lateral movement entirely by the action of the spring, substantially as set forth.

2. A valve body having fluid passages therethrough, a ring plate having a flat portion for closing the passages through the valve body and having a portion disposed at right angles thereto and forming an annular spring receiving recess, said valve body having an annular depending portion forming a second spring receiving recess, and a spring corresponding in size to and having its ends located in said spring receiving recesses and adapted to be maintained in position thereby, the annular depending portion of the valve body which forms the spring receiving recess also serving as a stop for limiting the opening movement of the valve, substantially as set forth.

In witness whereof, I have hereunto set my hand at Waynesboro, Pennsylvania this 3rd day of September, A. D. nineteen hundred and twenty-seven.

NORMAN M. SMALL.